United States Patent
Halalay et al.

(10) Patent No.: US 10,854,882 B2
(45) Date of Patent: Dec. 1, 2020

(54) NEGATIVE ELECTRODE FOR A LITHIUM-ION ELECTROCHEMICAL CELL AND METHOD OF FORMING SAME

(71) Applicant: GM Global Technology Operations LLC, Detroit, MI (US)

(72) Inventors: Ion C. Halalay, Grosse Pointe Park, MI (US); Raghunathan K, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 235 days.

(21) Appl. No.: 16/165,064

(22) Filed: Oct. 19, 2018

(65) Prior Publication Data

US 2020/0127292 A1 Apr. 23, 2020

(51) Int. Cl.
| | |
|---|---|
| H01M 4/62 | (2006.01) |
| H01M 10/0525 | (2010.01) |
| H01M 2/26 | (2006.01) |
| H01M 4/04 | (2006.01) |
| H01M 4/66 | (2006.01) |

(Continued)

(52) U.S. Cl.
CPC .............. H01M 4/625 (2013.01); H01M 2/26 (2013.01); H01M 4/0404 (2013.01); H01M 4/0471 (2013.01); H01M 4/133 (2013.01); H01M 4/1393 (2013.01); H01M 4/626 (2013.01);

(Continued)

(58) Field of Classification Search
None
See application file for complete search history.

(56) References Cited

U.S. PATENT DOCUMENTS 9,178,208 B2 11/2015 Park et al.
9,397,338 B2 7/2016 Park et al.
(Continued)

FOREIGN PATENT DOCUMENTS

JP 2018106846 A * 7/2018 ............. H01G 11/70

OTHER PUBLICATIONS

S. Yoon, S.-I. Lee, H. Kim, H.-J. Sohn, Enhancement of capacity of carbon-coated Si—Cu3Si composite anode using metal-organic compound for lithium-ion batteries, Journal of Power Sources, 2006, 1319-1323, 161.

(Continued)

Primary Examiner — Basia A Ridley
Assistant Examiner — Heng M. Chan
(74) Attorney, Agent, or Firm — Quinn IP Law

(57) ABSTRACT

A method of forming an electrode includes attaching a tab to a collector to form a pre-tabbed current collector; disposing the pre-tabbed current collector onto a non-stick substrate to form a workpiece; and casting a slurry onto the workpiece to form a film. The slurry includes an active material component, one or more carbon additives, and at least one of a filamentary copper additive and a dendritic copper additive. The method includes drying the film at a first temperature to form a dried film; curing the dried film under pressure at a second higher temperature to form a cured film; removing the cured film from the non-stick substrate to form a precursor film; and carbonizing and annealing the precursor film at a third higher temperature. Carbonizing forms a three-dimensional electrically-conductive network and annealing forms a second contiguous network of copper connected to the active material component to form the electrode.

20 Claims, 2 Drawing Sheets

(51) Int. Cl.
  *H01M 4/1393* (2010.01)
  *H01M 4/133* (2010.01)
  *H01M 4/02* (2006.01)
(52) U.S. Cl.
  CPC ....... *H01M 4/661* (2013.01); *H01M 10/0525* (2013.01); *H01M 2004/027* (2013.01)

(56) References Cited

U.S. PATENT DOCUMENTS

| | | | |
|---|---|---|---|
| 9,553,303 | B2 | 1/2017 | Park et al. |
| 9,806,328 | B2 | 10/2017 | Park et al. |
| 2019/0304709 | A1* | 10/2019 | Hasuo .............. H01G 11/70 |

OTHER PUBLICATIONS

Y. S. Jung, K. T. Lee, S. M. Oh, Si-carbon core-shell composite anode in lithium secondary batteries, Electrochimica Acta, 2007, 7061-7067, 52.
J.-K. Lee, M. C. Kung, L. Trahey, M. N. Missaghi, H. H. Kung, Nanocomposites derived from phenol-functionalized Si nanoparticles for high performance lithium ion battery anodes, Chemistry of Materials, 2007, 6-8, 21.
K. Wang, X. He, L. Wang, J., Ren, C. Jiang, C. Wan, Si, Si/Cu core in carbon shell composite as anode material in lithium-ion batteries, Solid State Ionics, Jan.-Feb. 2007, 115-118, 178.
L. Chen, X. Xie, J. Xie, K. Wang, J. Yang, Binder effect on cycling performance of silicon/carbon composite anodes for lithium ion batteries, Journal of Applied Electrochemistry, 2006, 1099-1104, 36.
H. Buqa, M. Holzapfel, F. Krumeich, C. Veit, P. Novak, Study of styrene butadiene rubber and sodium methyl cellulose as binder for negative electrodes in lithium-ion batteries, Journal of Power Sources, 2006, 617-622, 161.
J. Li, R. B. Lewis, J. R. Dahn, Sodium carboxymethyl cellulose, a potential binder for Si negative electrodes for Li-ion batteries, Electrochemistry and Solid-State Letters, 2007, A17-A20, 10.
B. Lestriez, S. Bahri, I. Sandu, L. Roué, D. Guyomard, On the binding mechanism of CMC in Si negative electrodes for Li-ion batteries, Electrochemistry Communications, 2007, 2801-2806, 9.
N.-S. Choi, K.H. Yew, W.-U. Choi, S.-S., Kim, Enhanced electrochemical properties of a Si-based anode using an electrochemically active polyamide imide binder, J. Power Sources, 2008, 590-594, 177.
A. Magasinski, B. Zdyrko, I. Kovalenko, B. Hertzberg, R. Burtovyy, C.F. Huebner, T.F. Fuller, I. Luzinov, G. Yushin, Toward efficient binders for Li-ion battery Si-based anodes: polyacrylic acid, ACS Appl. Mater. Interfaces, 2010, 3004, 2.
F. M. Hassan, V. Chabot, A. R. Elsayed, X. Xiao, Z. Chen, Engineered Si electrode nanoarchitecture: A scalable postfabrication treatment for the production of next-generation Li-ion batteries, Nano Lett., 2014, 277-283, 14.
J. Wang, M. Zhou, G. Tan, S. Chen, F. Wu, J. Lu, K. Amine, Encapsulating micro-nano Si/SiOx into conjugated nitrogen-doped carbon as binder-free monolithic anodes for advanced lithium ion batteries, Nanoscale, 2015, 8023-8034, 7.
V. A. Sethuraman, K. Kowolik, Venkat Srinivasan, Increased cycling efficiency and rate capability of copper-coated silicon anodes in lithium-ion batteries, J. Power Sources, 2011, 393-398, 196.
C. Joyce, L. Trahey, S.A. Bauer, F. Dogan, J. T. Vaughey, Metallic copper binders for lithium-ion battery silicon electrodes, J. Electrochem Soc., 2012, 227-233, 59.

X. Huang, H. Pu, J. Chang, S. Cui, P. B. Hallac, J. Jiang, P. T. Hurley, and J. Chen, Improved cyclic performance of Si anodes for lithium-ion batteries by forming intermetallic interphases between Si nanoparticles and metal microparticles, ACS Appl. Mater. Interf., 2013, 11965-11970, 5.
B.D. Polat, O. Keles, Improving Si anode performance by forming copper capped copper-silicon thin film anodes for rechargeable lithium ion batteries, Electrochim. Acta, 2015, 63-71, 170.
J. W. Kim, J. H. Ryu, K. T. Lee, S. M. Oh, Improvement of silicon powder negative electrodes by copper electroless deposition for lithium secondary batteries, J. Power Sources, 2005, 227-233, 147.
J. L. Gomez-Camer, J. Morales, L. Sanchez, Anchoring Si nanoparticles to carbon nanofibers: an efficient procedure for improving Si performance in Li batteries, J. Mater. Chem., 2011, 811-818, 21.
B. Lestriez, S. Desaever, J. Danet, P. Moreau, D. Plee, D. Guyomard, Hierarchical and resilient conductive network of bridged carbon nanotubes and nanofibers for high-energy Si negative electrodes, J. Electrochem. Solid-State Lett., 2009, A76-A80, 12.
D. Mazouzi, D. Reyter, M. Gauthier, P. Moreau, D. Guyomard, L. Roue, B. Lestriez, Very high surface capacity observed using Si negative electrodes embedded in copper foam as 3D current collectors, Adv. Energy Mat. 2015, article 1301718, 4.
M.-J. Choi, Y. Xiao, J.-Y. Hwang, I. Belharouak, Y.-K. Sun, Novel strategy to improve the Li-storage performance of micro silicon anodes, J. Power Sources, 2017, 302-310, 348.
D. Leblanc, P. Hovington, C. Kim, A. Guerfi, D. L. Bélanger, K. Zaghib , Silicon as anode for high-energy lithium ion batteries: from molten ingot to nanoparticles, J. Power Sources, 2015, 529-536, 299.
Z. Lu, N. Liu, H.-W. Lee, J. Zhao, W. Li, Y. Li, and Y. Cui, Nonfilling carbon coating of porous silicon micrometer-sized particles for high-performance lithium battery anodes, ACS Nano, 2015, 302-310, 2.
H. Jia, J. Zheng, J. Song, L. Luo, R. Yi, L. Estevez, W. Zhao, R. Patel, X. Li, J.-G. Zhang, A novel approach to synthesize micrometer-sized porous silicon as a high performance anode for lithium-ion batteries, Nano Energy, 2018, 589-597, 80.
C. Wang, H. Wu, Z. Chen, M. T. McDowell, Y. Cui, Z. Bao, Self-healing chemistry enables the stable operation of silicon microparticle anodes for high-energy lithium-ion batteries, Nature Chem., 2013, 1042-1048, 5.
M.-H. Ryou, J. Kim, I. Lee, S. Kim, Y. K. Jeong, S. Hong, J. H. Ryu, T.-S. Kim, J.-K. Park, H. Lee, J. W. Choi, Mussel-inspired adhesive binders for high-performance silicon nanoparticle anodes in lithium-ion batteries, Adv. Mat., 2013, 1571-1576, 25.
B.D. Assresahegn, D. Belanger, Effects of the formulations of silicon-based composite anodes on their mechanical, storage, and electrochemical properties, ChemSusChem, 2017, 4080-4089, 10.
Y. Cheng, Z. Yi, C. Wang, L. Wang, Y. Wu, L. Wang, Influence of copper addition for silicon-carbon composite as anode materials for lithium ion batteries, RSC Advances, 2016, 56756-56764, 6.
S. Yoon, S.-I. Lee, H. Kim, H.-J. Sohn, Enhancement of capacity of carbon-coated Si—Cu3Si composite anode using metal-organic compound for lithium-ion batteries, J. Power Sources, 2006, 1319-1323, 161.
T. Jiang, S. Zhang, X. Qiu, M. Sun, L. Chen, A three-dimensional cellular copper prepared by multiple-step electrodeposition, Electrochem. Solid-State Lett., 2008, D50-D52, 11.
H. Li, F. Cheng, Z. Zhu, H. Bai, Z. Tao, J. Chen, Preparation and electrochemical performance of copper foam-supported amorphous silicon thin films for rechargeable lithium-ion batteries, J. Alloys Compounds, 2011, 2919-2923, 209.

* cited by examiner

NEGATIVE ELECTRODE FOR A LITHIUM-ION ELECTROCHEMICAL CELL AND METHOD OF FORMING SAME

INTRODUCTION

The disclosure relates to a negative electrode for a lithium-ion electrochemical cell and to a method of forming the negative electrode.

Electrochemical cells or batteries are useful for converting chemical energy into electrical energy, and may be described as primary or secondary. Primary batteries are generally non-rechargeable, whereas secondary batteries are readily rechargeable and may be restored to a full charge after use. As such, secondary batteries may be useful for applications such as powering electronic devices, tools, machinery, and vehicles.

One type of secondary battery, a lithium-ion secondary battery, may include a negative electrode or anode, a positive electrode or cathode, and a separator disposed between the positive and negative electrodes. The negative electrode may be formed from a material that is capable of incorporating and releasing lithium ions during charging and discharging of the lithium-ion secondary battery. During charging of the lithium-ion secondary battery, lithium ions may move from the positive electrode to the negative electrode and embed, e.g., by intercalation, insertion, substitutional solid solution strengthening, or other means, in the material. Conversely, during battery discharge, lithium ions may be released from the material and move from the negative electrode to the positive electrode.

SUMMARY

A method of forming a negative electrode for a lithium-ion electrochemical cell includes attaching a tab formed from nickel to a current collector formed from a copper matrix to form a pre-tabbed current collector; disposing the pre-tabbed current collector onto a non-stick substrate including polytetrafluoroethylene to form a workpiece; and casting a slurry onto the workpiece to form a film disposed on the pre-tabbed current collector. The slurry includes the active material component, one or more carbon additives, and at least one of a filamentary copper additive and a dendritic copper additive. The method also includes drying the film at a first temperature to form a dried film; curing the dried film under pressure at a second temperature that is higher than the first temperature to form a cured film; and removing the cured film from the non-stick substrate to form a precursor film. Further, the method includes carbonizing and annealing the precursor film at a third temperature that is higher than the second temperature. Carbonizing forms a three-dimensional electrically-conductive network and annealing forms a second contiguous network of copper connected to the active material component to thereby form the negative electrode.

The method may also include annealing the three-dimensional electrically-conductive network at a fourth temperature that is higher than the third temperature. Annealing may include wicking molten copper through the three-dimensional electrically-conductive network. In one aspect, the three-dimensional electrically-conductive network may be a first contiguous network of carbon connected to the active material component.

Attaching may be prior to annealing. The method may further include preserving a structural integrity of the tab. Further, disposing may not include supporting the pre-tabbed current collector on a metal foil.

In a further aspect, drying may include heating the film to the first temperature of from 50° C. to 150° C. Drying may further include heating the film under a vacuum. Curing may include heating the dried film to the second temperature of from 200° C. to 400° C. Carbonizing may include heating the precursor film to the third temperature of from 600° C. to 900° C. Annealing may include heating the three-dimensional electrically-conductive network to the fourth temperature of from 900° C. to 1,300° C.

Annealing may include removing native silicon dioxide from the three-dimensional electrically-conductive network. The method may further include continuously casting the slurry, continuously drying the film, continuously curing the dried film, continuously removing the cured film, and continuously carbonizing and continuously annealing the precursor film.

A negative electrode for a lithium-ion electrochemical cell includes a pre-tabbed current collector that includes a current collector formed from a copper matrix, and a tab attached to the current collector and formed from nickel. The negative electrode also includes a cured composite material disposed on the pre-tabbed current collector. The composite material is formed from a slurry. The slurry includes an active material component; one or more carbon additives; and at least one of a filamentary copper additive and a dendritic copper additive. The cured composite material includes a first contiguous network of carbon connected to the active material component and a second contiguous network of copper connected to the active material component.

In one aspect, the filamentary copper additive may include microfilament copper. In another aspect, the dendritic copper additive may include dendritic copper powder. The at least one of the filamentary copper additive and the dendritic copper additive is present in the slurry in an amount of from 5 parts by weight to 50 parts by weight based on 100 parts by weight of the slurry.

A lithium-ion electrochemical cell may include the negative electrode, a positive electrode spaced apart from the negative electrode; and an electrolyte solution-filled separator disposed between the positive electrode and the negative electrode. A device may include the lithium-ion electrochemical cell.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
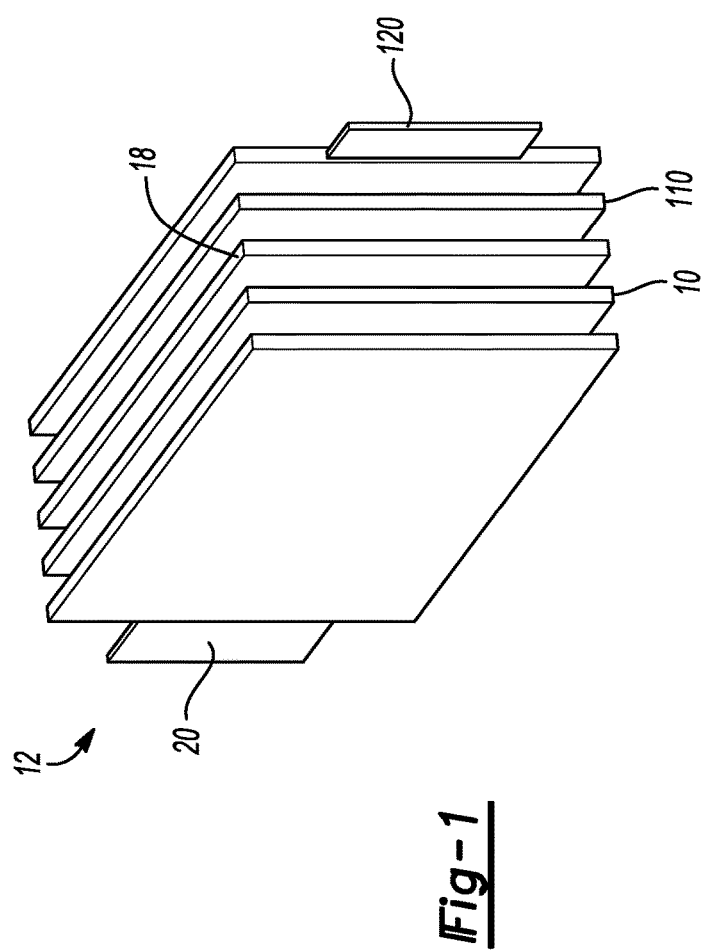
FIG. 1 is a schematic illustration of an exploded perspective view of a lithium-ion electrochemical cell including a negative electrode.
Figure 2:
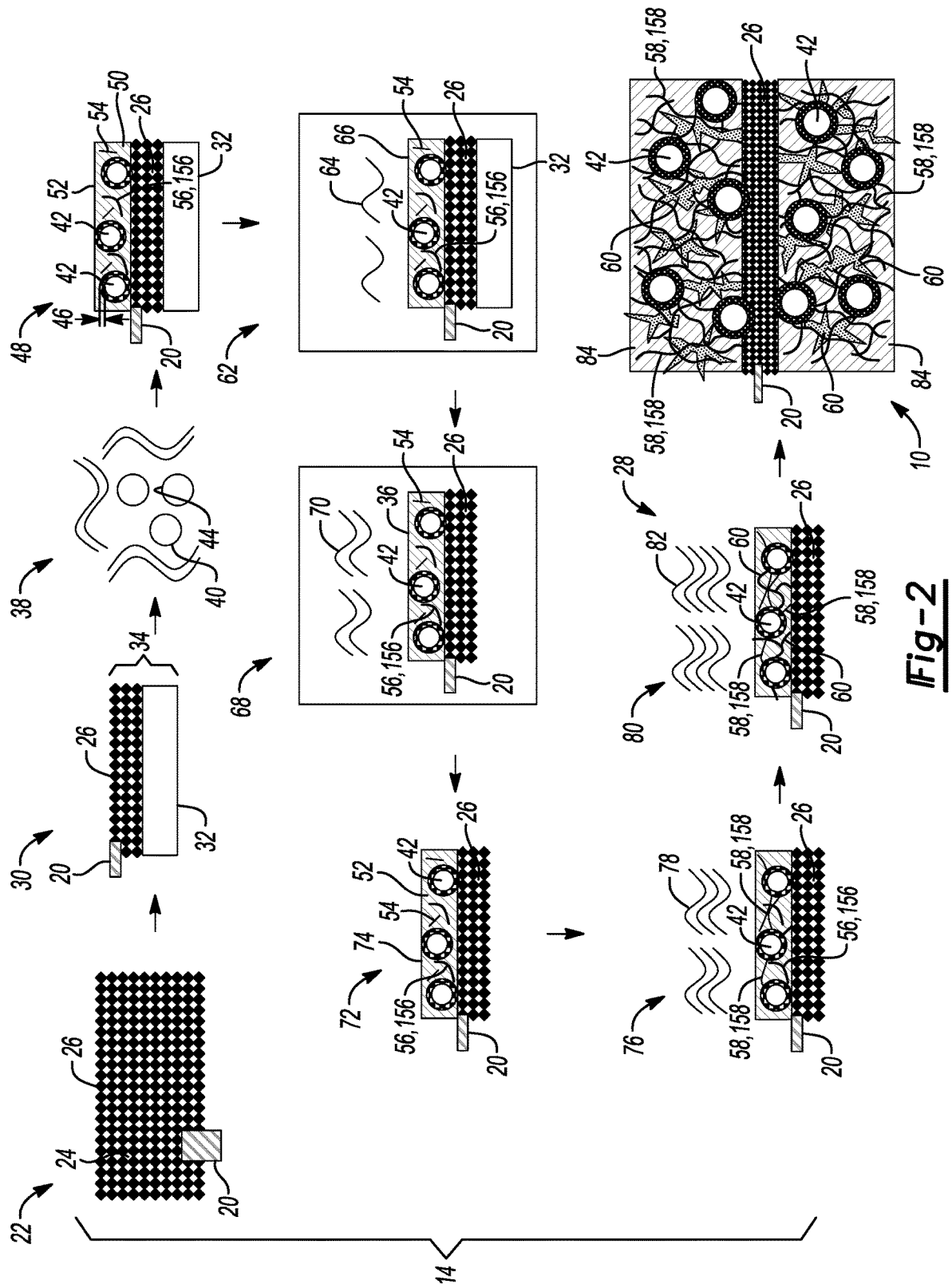
FIG. 2 is a schematic illustration of a method of forming the negative electrode of FIG. 1.

Referring to the Figures, wherein like reference numerals refer to like elements, a negative electrode 10 for a lithium-ion electrochemical cell 12 is shown generally in FIG. 1, and a method 14 for forming the negative electrode 10 is shown generally in FIG. 2. The negative electrode 10, lithium-ion electrochemical cell 12, and method 14 may be useful for applications requiring lithium-ion electrochemical cells 12 having excellent energy density, operating life, and charging speed. The method 14 may be simplified as compared to other manufacturing methods and scalable to mass production operations. Therefore, the negative electrode 10 and lithium-ion electrochemical cell 12 may be economical in terms of manufacturing time and cost.

As such, the negative electrode 10, lithium-ion electrochemical cell 12, and method 14 may be useful for vehicular applications such as, but not limited to, automobiles, buses, forklifts, motorcycles, bicycles, trains, trams, trolleys, spacecraft, airplanes, farming equipment, earthmoving or construction equipment, cranes, transporters, boats, and the like. Alternatively, the negative electrode 10, lithium-ion electrochemical cell 12, and method 14 may be useful for non-vehicular applications such as household and industrial power tools, residential appliances, electronic devices, computers, and the like. By way of a non-limiting example, the negative electrode 10, lithium-ion electrochemical cell 12, and method 14 may be useful for powertrain applications for non-autonomous, autonomous, or semi-autonomous vehicle applications.

Figure 3:
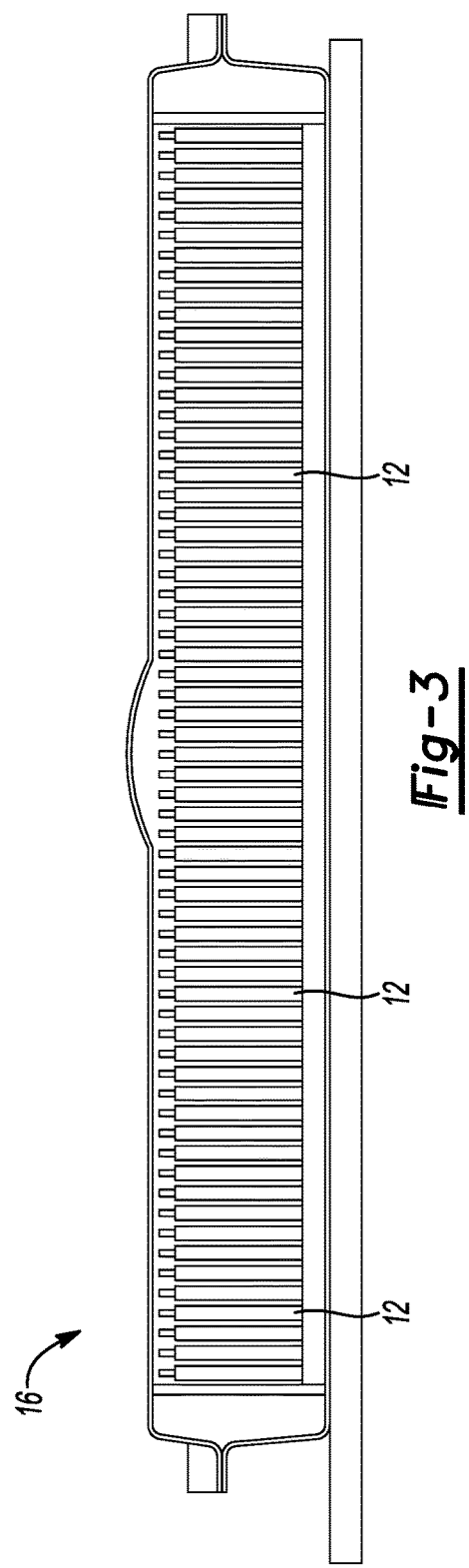
FIG. 3 is a schematic illustration of a cross-sectional view of a device including the lithium-ion electrochemical cell of FIG. 1.

Referring now to FIG. 1, the lithium-ion electrochemical cell 12 may be a secondary or rechargeable battery configured for converting energy and providing power to a device 16 (FIG. 3). That is, the device 16 may include the lithium-ion electrochemical cell 12. In one example, the device 16 may be a secondary battery module or pack configured for operation by electron transfer.

Therefore, the secondary battery module may be useful for automotive applications, such as for a plug-in hybrid electric vehicle (PHEV). For example, the secondary battery module may be a lithium-ion secondary battery module. Further, although not shown, a plurality of secondary battery modules may be combined to form a secondary battery or pack. That is, the secondary battery module may be connected to one or more other secondary battery modules to form the secondary battery. By way of example, the secondary battery module may be sufficiently sized to provide sufficient voltage for powering a hybrid electric vehicle (HEV), an electric vehicle (EV), a plug-in hybrid electric vehicle (PHEV), and the like, e.g., approximately 300 to 400 volts or more, depending on the required application. Alternatively, although not shown, the device 16 may be a vehicle and may include a plurality of lithium-ion electrochemical cells 12.

Further, as shown in FIG. 1, the lithium-ion electrochemical cell 12 may include the negative electrode 10 (or anode), a positive electrode 110 (or cathode) spaced apart from the negative electrode 10, and an electrolyte solution-filled separator 18 disposed between the positive electrode 110 and the negative electrode 10. In addition, the lithium-ion electrochemical cell 12 may have a positive electrode tab 120 and a negative electrode tab 20, and the lithium-ion electrochemical cell 12 may be suitable for stacking. That is, the lithium-ion electrochemical cell 12 may be packaged in a heat-sealable flexible metallized multilayer polymeric foil, or inside a metal can, that is sealed to enclose the positive electrode 110, the negative electrode 10, and the electrolyte solution-filled separator 18. Therefore, a number of lithium-ion electrochemical cells 12 may be stacked or otherwise placed adjacent to each other to form a cell stack, i.e., the secondary battery module or pack. The actual number of lithium-ion electrochemical cells 12 may be expected to vary with the required voltage output of each secondary battery module. Likewise, the number of interconnected secondary battery modules may vary to produce the total output voltage for a specific application.

Referring again to FIG. 3, the device 16 may include the lithium-ion electrochemical cell 12. The lithium-ion electrochemical cell 12 may incorporate lithium iron phosphate, lithium vanadium pentoxide, lithium manganese dioxide, a mixed lithium-manganese-nickel oxide, a mixed lithium-nickel-cobalt oxide, a mixed lithium-manganese-nickel-cobalt oxide, and combinations thereof as a material for the positive electrode 110 (FIG. 1). The lithium-ion electrochemical cell 12 may incorporate, for example, graphite, amorphous carbon, lithium titanate, silicon, silicon oxide, tin, tin oxide, and combinations thereof as a material for the negative electrode 10 (FIG. 1).

Referring now to FIG. 2, the method 14 of forming the negative electrode 10 includes attaching 22 a tab 20 formed from nickel to a current collector 24 formed from a copper matrix to form a pre-tabbed current collector 26. In another non-limiting example, the tab 20 may be formed from a nickel-copper alloy. For example, the method 14 may include attaching 22 several nickel tabs 20 to a current collector sheet 24 to form the pre-tabbed current collector sheet 26. That is, the copper current collector 24 may be provided a sheet in rolled form, and the tab 20 may be attached to the sheet of copper current collector 24 as the sheet unrolls.

That is, as shown in FIG. 1, in some embodiments, the lithium-ion electrochemical cell 12 may include two tabs 20, 120 disposed at opposite ends of the lithium-ion electrochemical cell 12 that are attached, respectively, to the negative electrode 10 and positive electrode 110. Such a configuration may be suitable for applications requiring secondary battery capacities of greater than, for example, 30 Ah or 50 Ah, where 1 Ah is an amount of electrical energy generated or consumed when a current of one Ampere flows in the presence of a potential difference (or voltage difference) of one Volt.

The current collector 24 may be a suitable copper matrix. For example, the current collector 24 may be a solid sheet formed from copper. Alternatively, the current collector 24 may be a foil formed from copper and may define a plurality of perforations or slits therein. Alternatively, the current collector 24 may be a woven mesh made from copper. In other embodiments, the current collector 24 may be a copper foam.

The tab 20 is formed from nickel to ensure adequate electrical communication with the device 16 (FIG. 3). That is, the tab 20 may be joined or attached to each current collector 24 of the lithium-ion electrochemical cell 12 and exit a housing of the lithium-ion electrochemical cell 12 to allow energy stored by the lithium-ion electrochemical cell 12 to be transferred to an external source, e.g., the device 16. In other non-limiting examples, the tab 20 may be formed from a nickel-copper alloy.

In one embodiment, attaching 22 may include welding the tab 20 formed from nickel onto the current collector 24, e.g., the current collector sheet 24, to thereby form the pre-tabbed current collector 26. Importantly, attaching 22 the tab 20 may occur before other processes of the method 14. That is, the method 14 may include welding the tab 20 to the current collector 24 to form the pre-tabbed current collector 26, e.g., the pre-tabbed current collector sheet 26, before further processing to form the negative electrode 10. Such pre-tabbing of the current collector 24 may enable heat treatment of the negative electrode assembly during subsequent manufacturing stages at temperatures above a melting point of copper, e.g., at temperatures greater than 1,085° C., without harming or degrading the tab 20. As such, the method 14 may include preserving 28 (FIG. 2) a structural integrity of the tab 20 even at comparatively high heat treatment temperatures.

Referring again to FIG. 2, the method 14 also includes, after attaching 22, disposing 30 the pre-tabbed current collector 26 onto a non-stick substrate 32 including polytetrafluoroethylene (PTFE) to form a workpiece 34. That is, the non-stick substrate 32 may be formed from a material, such as a fluoropolymer or polytetrafluoroethylene-impregnated hard-anodized aluminum, that allows another substance to be easily removed from the non-stick substrate 32. By way of non-limiting examples, the non-stick substrate 32 may include or be formed from polytetrafluoroethylene (PTFE), a perfluoroalkoxy alkane (PFA), polyvinylidene difluoride (PVDF), poly(fluoroethylene-propylene) (FEP), polytetrafluoroethylene-impregnated hard-anodized aluminum, polytetrafluoroethylene-coated brass, polytetrafluoroethylene-coated copper, polytetrafluoroethylene-coated stainless steel, polytetrafluoroethylene-coated nickel, polytetrafluoroethylene-coated nickel alloys, and combinations thereof. In one example, the non-stick substrate 32 may be a sheet formed from or including polytetrafluoroethylene. In another example, the non-stick substrate 32 may be one or more rollers formed from polytetrafluoroethylene-impregnated hard-anodized aluminum. The non-stick substrate 32 includes or is formed from polytetrafluoroethylene to allow for removal of a cured film 36 from the non-stick substrate 32 during subsequent processes of the method 14, as set forth in more detail below.

Conversely, disposing 30 may not include supporting the pre-tabbed current collector 26 on a metal foil, e.g., on an aluminum foil. As such, the method 14 may not include metal etching, washing, and/or drying to remove the cured film 36 from the non-stick substrate 32, as also set forth in more detail below. Further, disposing 30 may be a continuous process such that the pre-tabbed current collector 26 is, for example, rolled onto the non-stick substrate 32 using rollers made of PTFE-impregnated hard-anodized aluminum.

As described with continued reference to FIG. 2, the method 14 may also include providing 38 a plurality of active material particles 40 coated with carbon and/or copper to form an active material component 42. That is, the copper or a mixture of copper and carbon may form a protective coating on the active material particles 40. Further, the copper may act as an attachment point or weld stub for copper filaments and/or dendrites included in a slurry 50 used to form the negative electrode 10, as set forth in more detail below.

The active material may be silicon, a silicon oxide, a silicon alloy, tin, or a tin alloy and the copper may protect or coat a surface 44 of each of the plurality of active material particles 40. For example, the active material may be nano- or micron-sized silicon particles or nano-porous micron-sized silicon particles coated with the protective coating of copper. In particular, the protective coating may form a film on the surface 44 of the active material particles 40 that may lessen parasitic reactions which may consume electrolyte during operation of the lithium-ion electrochemical cell 12. The protective coating may have a uniform thickness 46. A suitable uniform thickness 46 of the protective coating on the active material particles 40 may be from 2 nm to 50 nm, wherein 1 nanometer is equal to $1 \times 10^{-9}$ meters.

Copper may completely cover the surface 44 of each of the plurality of active material particles 40 or copper may cover solely a portion of the surface 44 of each of the plurality of active material particles 40. For example, copper may cover from 10% to 50% of the surface 44 of each of the active material particles 40. In another example, carbon may cover from 50% to 90% of the surface 44 of each of the plurality of active material particles 40. Alternatively, copper may cover an entirety of the surface 44 of each of the active material particles 40.

Referring again to FIG. 2, the method 14 further includes casting 48 the slurry 50 onto the workpiece 34 to form a film 52 disposed on the pre-tabbed current collector 26. For example, casting 48 may include extruding or bar coating or knife coating the slurry 50 onto the pre-tabbed current collector 26. In one embodiment, casting 48 may include applying the slurry 50 to the workpiece 34 with a flat blade (not shown) spaced apart from the workpiece 34 at a controlled distance, such that the flat blade spreads the slurry 50 over the workpiece 34. Further, casting 48 the slurry 50 may be continuous or may be a batch process or a semi-batch process.

The slurry 50 includes the active material component 42, one or more carbon additives 54, and at least one of a filamentary copper additive 56 and a dendritic copper additive 156. Suitable carbon additives 54 may be selected for electrical conductivity and may include, but are not limited to, carbon fibers, carbon nanofibers, carbon nanotubes, graphite, graphene, and combinations thereof. For example, the one or more carbon additives 54 may include vapor grown carbon fibers to provide the negative electrode 10 with excellent stiffness and elasticity. In another example, the one or more carbon additives 54 may include single-wall carbon nanotubes to provide electrical contact points with the active material component 42 and an electronic conduction path to the pre-tabbed current collector 26, even if the active material particles 40 degrade during electrochemical cycling of the lithium-ion electrochemical cell 12. In another example, the one or more carbon additives 54 may include graphene sheets to provide the negative electrode 10 with excellent stiffness, elasticity, and electronic conduction paths. In a further example, the one or more carbon additives 54 may include graphite particles to provide the negative electrode 10 with lubrication and electronic conduction paths. The one or more carbon additives 54 may form a three-dimensional electrically-conductive network 58 within the formed negative electrode 10. In particular, the three-dimensional electrically-conductive network 58 may be a first contiguous network 158 of carbon connected to the active material component 42.

Further, the filamentary copper additive 56 and/or the dendritic copper additive 156 may include a plurality of thin threads or fibers or copper dendrites. For example, the filamentary copper additive 56 and/or the dendritic copper additive 156 may include at least one of microfilament copper and dendritic copper powder and may form interconnected branches of copper during subsequent processing of the negative electrode 10. In one non-limiting example, the filamentary copper additive 56 may include nano- or micro-filaments of copper. In another non-limiting example, the dendritic copper additive 156 may include copper dendrites. The filamentary copper additive 56 and/or the dendritic copper additive 156 may be selected to impart excellent electrical conductivity and fast charging capabilities to the formed negative electrode 10 via a second contiguous network 60 of copper connected to the active material component 42 and the pre-tabbed current collector 26 formed from the copper matrix, as set forth in more detail below.

The at least one of the filamentary copper additive 56 and the dendritic copper additive 156 may be present in the slurry 50 in an amount of from 5 parts by weight to 50 parts by weight based on 100 parts by weight of the slurry. For example, the filamentary copper additive 56 and/or the dendritic copper additive 156 may be present in the slurry 50 in an amount of 10 parts by weight or 15 parts by weight or 20 parts by weight or 25 parts by weight or 30 parts by weight or 35 parts by weight or 40 parts by weight or 45 parts by weight based on 100 parts by weight of the slurry 50.

In addition, the slurry 50 may include a polymer binder or polymer precursor and a dispersing solvent. The polymer binder or polymer precursor may bind or glue the negative electrode 10 together and may provide mechanical stability to electrical contact points between the one or more carbon additives 54, e.g., single wall carbon nanotubes, and the active material particles 40. Suitable compounds, polymer binders, or polymer precursors may include, but are not limited to, nitrogen-containing compounds and polymers such as polyimides, polyamic acid, phenolic resins, epoxy resins, polyethyleneimines, polyacrylonitrile, melamine, cyanuric acid, and combinations thereof. Suitable solvents may include, but are not limited to, as n-methyl pyrrolidone, methanol, ethanol, isopropanol, acetone, water, and combinations thereof.

Referring again to FIG. 2, the method 14 also includes drying 62 the film 52 at a first temperature 64 to form a dried film 66. That is, drying 62 may include heating the film 52 to the first temperature 64 of from 50° C. to 150° C. For example, drying 62 may include heating the film 52 to the first temperature 64 of 60° C. or 70° C. or 80° C. or 90° C. or 100° C. or 110° C. or 120° C. or 130° C. or 140° C. Drying 62 may further include exposing the film 52 to a gas. Subsequently, drying 62 may further include heating the film 52 under a vacuum. Such drying 62 may begin to solidify the slurry 50 and remove a portion or an entirety of the solvent from the film 52.

The method 14 further includes curing 68 the dried film 66 under pressure at a second temperature 70 that is higher than the first temperature 64 to form a cured film 36. That is, curing 68 may include heating the dried film 66 to the second temperature 70 of from 200° C. to 400° C. for from 1 hour to 24 hours. For example, curing 68 may include heating the dried film 66 to the second temperature 70 of 220° C. or 240° C. or 260° C. or 280° C. or 300° C. or 320° C. or 340° C. or 360° C. or 380° C. for from 4 hours or 6 hours or 8 hours to 12 hours or 16 hours or 20 hours. More specifically, curing 68 may include hot-pressing or calendaring the dried film 66 disposed on the pre-tabbed current collector 26 by passing the dried film 66 between rollers (not shown) in a continuous process. The rollers may be formed from, for example, polytetrafluoroethylene-impregnated hard-anodized aluminum, polytetrafluoroethylene-coated brass, polytetrafluoroethylene-coated copper, polytetrafluoroethylene-coated stainless steel, polytetrafluoroethylene-coated nickel, polytetrafluoroethylene-coated nickel alloys, and combinations thereof. Curing 68 may therefore harden, flatten, and further dry the dried film 66.

In addition, the method 14 also includes removing 72 the cured film 36 from the non-stick substrate 32 to form a precursor film 74. For example, since the non-stick substrate 32 includes polytetrafluoroethylene, the non-stick substrate 32 may be peeled off from the cured film 36 to form a freestanding, monolithic precursor film 74. Notably, since the non-stick substrate 32 is not a metal foil such as an aluminum foil, removing 72 may not include etching, washing, and/or drying to remove the cured film 36 from the non-stick substrate 32 and eliminate undesirable chemicals from the cured film 36. That is, etching is not required to remove the non-stick substrate 32 from the cured film 36. Similarly, washing the cured film 36 is not required to remove the non-stick substrate 32 from the cured film 36. Likewise, drying the cured film 36 is not required to remove the non-stick substrate 32 from the cured film 36.

As described with continued reference to FIG. 2, the method 14 also includes carbonizing 76 and annealing 80 the precursor film 74 at a third temperature 78 that is higher than the second temperature 70 to form the three-dimensional electrically-conductive network 58. That is, carbonizing 76 and annealing 80 may include heating the precursor film 74 to the third temperature 78 of from 600° C. to 900° C. for from 1 hour to 4 hours to pyrolize (or arbonize) the precursor film 74. For example, carbonizing 76 and annealing 80 may include heating the precursor film 74 to the third temperature 78 of 650° C. or 700° C. or 750° C. or 800° C. or 850° C. in an atmosphere of, for example, air, argon, nitrogen, or nitrogen/air.

Carbonizing 76 may convert the polymer binder, polymer precursor, and/or the one or more carbon additives 54 into the three-dimensional electrically-conductive network 58 to thereby provide electrical conduction paths in the negative electrode 10. That is, a carbonized binder and/or polymer and the one or more carbon additives 54 may form a continuous electrically-conductive carbon network, i.e., the first contiguous network 158 of carbon, that is connected to the active material component 42 along an entirety of the precursor film 74, rather than merely suspending the active material component 42 in a non-conductive binder. Therefore, since the first contiguous network 158 is formed from electrically-conductive carbon, and since the active material component 42 includes the plurality of active material particles 40 coated with the mixture of copper and carbon, carbonizing 76 may enhance the electrical conductivity of the formed negative electrode 10.

In addition, the method 14 may further include annealing 80 the three-dimensional electrically-conductive network 58 at a fourth temperature 82 that is higher than the third temperature 78 to thereby form the negative electrode 10. That is, annealing 80 may include heating the three-dimensional electrically-conductive network 58 to the fourth temperature 82 of from 900° C. to 1,300° C. for from 1 hour to 4 hours in an atmosphere containing an inert gas, such as argon and/or nitrogen, or a reducing gas, such as hydrogen/argon or carbon monoxide/argon. For example, annealing 80 may include heating the first contiguous network 158 of carbon connected to the active material component 42 to the fourth temperature 82 of 950° C. or 1,000° C. or 1,050° C. or 1,100° C. or 1,150° C. or 1,200° C. or 1,250° C. Upon heating to the third temperature 78 or the fourth temperature 82, annealing 80 may include forming copper silicide ($Cu_3Si$).

In particular, annealing 80 may include wicking molten copper through the three-dimensional electrically-conductive network 58. That is, annealing 80 may include forming the second contiguous network 60 of copper connected to the active material component 42. Further, the second contiguous network 60 of copper may further electrically connect the three-dimensional electrically-conductive network 58 formed from carbon to the pre-tabbed current collector 26 formed from the copper matrix. That is, upon annealing 80 to a fourth temperature 82 above a melting point of copper, e.g., above 1,085° C., the filamentary copper additive 56 and/or the dendritic copper additive 156 and the pre-tabbed current collector 26 formed from copper may melt to create the second contiguous network 60 having excellent electrical conductivity. As such, the second contiguous network 60 may enable fast charging of the lithium-ion electrochemical cell 12 and may enhance the electrical conductivity of the three-dimensional electrically-conductive network 58. Annealing 80 may also include removing native silicon dioxide and other impurities from the three-dimensional electrically-conductive network 58. Therefore, annealing 80 may enhance both the mechanical integrity and the electrical conductivity of the negative electrode 10.

In one embodiment, casting 48 and annealing 80 may be continuous. That is, the method 14 may be a continuous manufacturing process. Stated differently, the method 14 may include continuously casting 48 the slurry 50, continuously drying 62 the film 52, continuously curing 68 the dried film 66, continuously removing 72 the cured film 36, and continuously carbonizing 76 and continuously annealing 80 the precursor film 74. Further, as set forth above, attaching 22 may be prior to annealing 80. That is, the tab 20 may be attached to the current collector 24 to form the pre-tabbed current collector 26 before the three-dimensional electrically-conductive network 58 is annealed. Despite the pre-tabbing, annealing 80 may not harm or degrade the tab 20 even when the tab 20 is subjected to the third temperature 78 and/or the fourth temperature 82. As such, the method 14 eliminates attaching the tab 20 after annealing 80, is therefore cost-effective and efficient, and forms a robust negative electrode 10.

Referring again to FIG. 2, the formed negative electrode 10 for the lithium-ion electrochemical cell 12 includes the pre-tabbed current collector 26. As set forth above, the pre-tabbed current collector 26 includes the current collector 24 formed from the copper matrix, the tab 20 attached to the current collector 24, and a cured composite material 84 disposed on the pre-tabbed current collector 26 and formed from the slurry 50. The slurry 50 includes the active material component 42; one or more carbon additives 54; and at least one of the filamentary copper additive 56 and the dendritic copper additive 156.

Further, as illustrated in FIG. 2, the cured composite material 84 includes the first contiguous network 158 of carbon connected to the active material component 42 and the second contiguous network 60 of copper connected to the active material component 42.

Therefore, the negative electrode 10 and lithium-ion electrochemical cell 12 exhibit excellent energy density, operating life, and charging speed. In particular, the inclusion of filamentary and/or dendritic copper provides the negative electrode 10 and lithium-ion electrochemical cell 12 with enhanced electrical conductivity since the second contiguous network 60 of copper is intertwined and connected with the active material component 42 and the pre-tabbed current collector 26. Further, the method 14 is economical and efficient and eliminates or consolidates processes to form the negative electrode 10. In particular, the method 14 does not include etching, washing, or drying, yet the cured film 36 may be easily removed from the non-stick substrate 32. Therefore, the negative electrode 10 and lithium-ion electrochemical cell 12 may be economical in terms of manufacturing time and cost, may be scalable to mass production manufacturing operations, and may eliminate manufacturing steps such as etching, washing, and drying.

While the best modes for carrying out the disclosure have been described in detail, those familiar with the art to which this disclosure relates will recognize various alternative designs and embodiments for practicing the disclosure within the scope of the appended claims.

What is claimed is:

1. A method of forming a negative electrode for a lithium-ion electrochemical cell, the method comprising:
    attaching a tab formed from nickel to a current collector formed from a copper matrix to form a pre-tabbed current collector;
    disposing the pre-tabbed current collector onto a non-stick substrate including polytetrafluoroethylene to form a workpiece;
    casting a slurry onto the workpiece to form a film disposed on the pre-tabbed current collector, wherein the slurry includes:
        an active material component;
        one or more carbon additives; and
        at least one of a filamentary copper additive and a dendritic copper additive;
    drying the film at a first temperature to form a dried film;
    curing the dried film under pressure at a second temperature that is higher than the first temperature to form a cured film;
    removing the cured film from the non-stick substrate to form a precursor film; and
    carbonizing and annealing the precursor film at a third temperature that is higher than the second temperature;
    wherein carbonizing forms a three-dimensional electrically-conductive network and annealing forms a contiguous network of copper connected to the active material component to thereby form the negative electrode.

2. The method of claim 1, further including annealing the three-dimensional electrically-conductive network at a fourth temperature that is higher than the third temperature.

3. The method of claim 1, wherein annealing includes wicking molten copper through the three-dimensional electrically-conductive network.

4. The method of claim 1, wherein the three-dimensional electrically-conductive network is a first contiguous network of carbon connected to the active material component.

5. The method of claim 1, wherein attaching is prior to annealing.

6. The method of claim 5, further including preserving a structural integrity of the tab.

7. The method of claim 1, wherein disposing does not include supporting the pre-tabbed current collector on a metal foil.

8. The method of claim 1, wherein drying includes heating the film to the first temperature of from 50° C. to 150° C.

9. The method of claim 8, wherein drying further includes heating the film under a vacuum.

10. The method of claim 1, wherein curing includes heating the dried film to the second temperature of from 200° C. to 400° C.

11. The method of claim 1, wherein carbonizing includes heating the precursor film to the third temperature of from 600° C. to 900° C.

12. The method of claim 2, wherein annealing includes heating the three-dimensional electrically-conductive network to the fourth temperature of from 900° C. to 1,300° C.

13. The method of claim 1, wherein annealing includes removing native silicon dioxide from the three-dimensional electrically-conductive network.

14. The method of claim 1, further including continuously casting the slurry, continuously drying the film, continuously curing the dried film, continuously removing the cured film, and continuously carbonizing and continuously annealing the precursor film.

15. A negative electrode for a lithium-ion electrochemical cell, the negative electrode comprising:
- a pre-tabbed current collector including:
  - a current collector formed from a copper matrix; and
  - a tab attached to the current collector and formed from nickel; and
- a cured composite material disposed on the pre-tabbed current collector and formed from a slurry including:
  - an active material component;
  - one or more carbon additives; and
  - at least one of a filamentary copper additive and a dendritic copper additive;
- wherein the cured composite material includes:
  - a first contiguous network of carbon connected to the active material component; and
  - a second contiguous network of copper connected to the active material component.

16. The negative electrode of claim 15, wherein the filamentary copper additive includes microfilament copper.

17. The negative electrode of claim 15, wherein the dendritic copper additive includes dendritic copper powder.

18. The negative electrode of claim 15, wherein the at least one of the filamentary copper additive and the dendritic copper additive is present in the slurry in an amount of from 5 parts by weight to 50 parts by weight based on 100 parts by weight of the slurry.

19. A lithium-ion electrochemical cell comprising the negative electrode of claim 15; a positive electrode spaced apart from the negative electrode; and an electrolyte solution-filled separator disposed between the positive electrode and the negative electrode.

20. A device comprising the lithium-ion electrochemical cell of claim 19.

* * * * *